United States Patent Office 2,794,812
Patented June 4, 1957

2,794,812

7-OXABICYCLO-HEPTANE 3-CARBOXYLIC ACIDS AND ESTERS

Benjamin Phillips and Paul S. Starcher, Charleston, W. Va., assignors to Union Carbide and Carbon Corporation, a corporation of New York No Drawing. Application August 13, 1953, Serial No. 374,144

14 Claims. (Cl. 260—348)

This invention relates to a new class of organic compounds and has for an object the provision of new organic compounds which are suitable for use in the plastics and resins industry. More particularly, this invention relates to epoxides prepared from $\Delta^3$-cyclohexene carboxylic acids and esters thereof.

The compounds of this invention may be conveniently represented as follows:

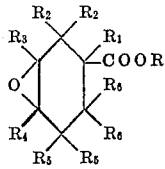

wherein $R_1$, $R_2$, $R_3$, $R_4$, $R_5$, and $R_6$ are members selected from the group consisting of hydrogen and alkyl radicals and R is a member selected from the group consisting of hydrogen and the radical derived from the alcohol used in the esterification reaction said alcohol being free from acetylenic unsaturation.

The compounds of this invention are useful as modifiers and plasticizers for certain types of synthetic condensation resins and are particularly useful as stabilizers for various synthetic resins.

Furthermore, the compounds of this invention are useful as intermediates in the preparation of a large number of new chemical compounds by virtue of their reactive epoxide group which can be reacted with a large number of compounds having a labile hydrogen atom. Additionally, the new compounds are useful intermediates in the preparation of synthetic lubricants, tanning agents and biological preparations.

The epoxides prepared from the oxidation of $\Delta^3$-cyclohexenecarboxylic acids and esters are preferably named 7-oxabicyclo [4.1.0] heptane-3-carboxylic acids and the esters thereof in accordance with the system of nomenclature adopted by the American Chemical Society for use in Chemical Abstracts.

The compounds of this invention are produced by the oxidation of the olefinic linkage contained in the starting material, such as, for example, $\Delta^3$-cyclohexenecarboxylic acid, and two oxidation methods are provided, both of which are satisfactory and provide commercially acceptable yields.

The first oxidation method is called the acetaldehyde monoperacetate method and the reaction whereby the epoxides are formed may be illustrated by the following equation:

*Acetaldehyde monoperacetate method*

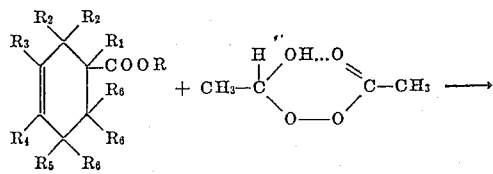

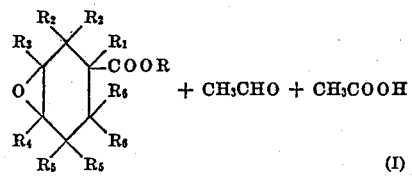

wherein $R_1$, $R_2$, $R_3$, $R_4$, $R_5$, and $R_6$ are members selected from the group consisting of hydrogen and methyl radicals and R is a member selected from the group consisting of hydrogen and the radical derived from the alcohol used in the esterification reaction.

The second oxidation method is called the peracetic acid method and the reaction whereby the epoxides are formed may be illustrated by the following equation:

*Peracetic acid method*

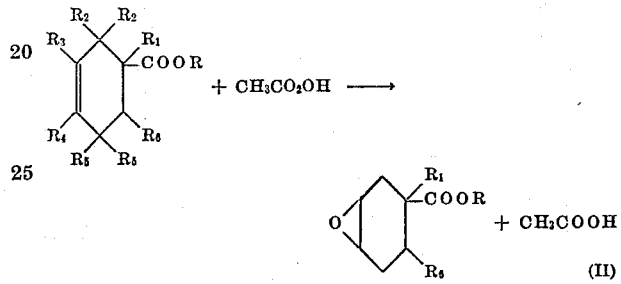

wherein $R_1$, $R_2$, $R_3$, $R_4$, $R_5$, and $R_6$ are members selected from the group consisting of hydrogen and alkyl radicals and R is a member selected from the group consisting of hydrogen and the radical derived from the alcohol used in the esterification reaction.

The use of peracetic acid as the oxidizing agent is particularly well suited for the epoxidation reaction since the cyclohexenyl ring is relatively easily converted to the corresponding epoxy form. This particular ability of the peracetic acid and other peracids, in general, to promote clean cut reactions and provide acceptable yields is not unusual in the art of oxidizing organic compounds for it has long been recognized that the peracids occupy somewhat a unique position in the field of oxidizing reagents since they are able to effect several specific types of chemical transformations with acceptable efficiencies while other powerful oxidizing reagents, such as potassium permanganate, are not.

Among the most interesting types of chemical transformations peculiar to the peracids is that type of reaction which makes available the compounds of this invention, that is, the oxidation of unsaturtaed organic compounds to yield the corresponding epoxides.

The starting materials, from which the epoxide compounds of this invention are prepared, are derived by the reaction of butadiene and homologs of butadiene with alpha, beta-unsaturated aliphatic acids.

Listed below are various combinations of reactants which may be advantageously employed in preparing compounds suitable for use as starting materials:

Crotonic acid and 2-methyl-1,3-pentadiene
2-methyl-3-ethylacrylic acid and 2,3-dimethyl butadiene
Acrylic acid and isoprene (2-methyl butadiene)
Crotonic acid and 2,4-dimethyl-1,3-butadiene
Crotonic acid and 1,3-pentadiene
3-ethyl acrylic acid and isoprene
Acrylic acid and 2,4-hexadiene
2-methyl-3-ethyl acrylic acid and isoprene
Acrylic acid and butadiene
Crotonic acid and butadiene As may be seen, from a study of the list presented above, the starting materials, prior to epoxidation, may contain alkyl groups of varying chain lengths on one or more of the ring positions.

The alcohols suitable for use in the esterification reaction may be any suitable monohydric alcohol, polyhydric alcohol, ether alcohols, ether glycols, halogenated alcohols, thiodiglycols and the like, such as, for example, methanol, ethanol, butanol, hexanol, benzyl alcohol, 3-cyclohexenylmethanol, diethylene glycol, 2-ethyl-1,3-hexanediol, 3-methyl-1,5-pentanediol, 2-methoxymethyl-2,4-dimethyl-1,5-pentanediol, triethylene glycol, 1,5-pentanediol, allyl alcohol, ethylene glycol, 1,1,1-trimethylol propane.

The products of this invention are particularly attractive in view of the fact that they are potentially low cost chemicals, since butadiene and the three alpha, beta-unsaturated aldehydes; acrolein, methacrolein, and crotonaldehyde, are economical starting materials and the steps required to produce the epoxides are conducted with high efficiencies.

This application is a continuation-in-part of application Serial No. 303,152, filed August 7, 1952.

The following examples will serve to illustrate the practice of the invention:

EXAMPLE I

*Preparation of allyl 3,4-epoxycyclohexanecarboxylate*

Eighteen hundred seventy grams of a 24.8% solution of peracetic acid in acetone (464 g., 6.11 mols, of peracetic acid) were fed dropwise over a period of three and one-half hours to 812 g. (4.89 mols) of allyl 3-cyclohexenecarboxylate with stirring at 40–45° C. The reaction conditions were maintained for an additional one and one-half hours, at which time analysis indicated that all of the peracetic acid had been consumed.

The reaction solution was stored at −11° C. for sixteen hours and then added dropwise to a still kettle containing 3000 g. of ethylbenzene refluxing at 20 mm. pressure, and peracetic acid, acetic acid, acetone, and ethylbenzene were distilled off at the top of the kettle during the addition. After addition was over, excess ethylbenzene was stripped off and there was obtained 922 g. of residue product, analyzing 90.1% as allyl 3,4-epoxycyclohexanecarboxylate by determination of epoxide groups. The yield of epoxide was 93.5%. The residue was distilled on a short fractionating column and there was obtained 690 g. of allyl 3,4-epoxycyclohexanecarboxylate, B. P. 85–95° C. at 0.5 mm., $n_D^{30}$ 1.4727, which analyzed 97.9% purity by epoxide analysis.

EXAMPLE II

*Preparation of ethyl 3,4-epoxycyclohexane-1-carboxylate*

A quantity of 924 grams of ethyl 3-cyclohexenecarboxylate was placed in a four necked, five liter flask equipped with a stirrer, reflux condenser, dropping funnel, and thermometer. At 40° C., addition of a 25.6% peracetic-acid solution in acetone was begun. After four hours, all of the necessary 2230 grams of peracetic acid solution had been added. This provided a 25% excess of peracetic acid. Two additional hours of heating at 40° C. were found sufficient to provide a conversion of 98.5% based on the consumption of peracetic acid.

The reaction mixture was then fed slowly into a steel kettle containing refluxing ethylbenzene under reduced pressure. The unspent peeracetic acid, acetone, acetic acid and some ethylbenzene were removed continuously from the top of a fractionating column fitted to the kettle. Unler these conditions, acetic acid and ethylbenzene are last removed as a constant boiling mixture.

When all of the acetic acid, acetone, peracetic-acid, and ethylbenzene had been removed, the kettle material was recharged to another kettle attached to a 24″ packed column and distilled under reduced pressure. Following the removal of a small forerun, 815 grams of ethyl 7-oxabicyclo [4.1.0]-heptane-3-carboxylate were collected at 85.0° and 3.0 mm. pressure ($n_D^{30}$=1.4568). An analysis for the epoxide groups present showed that the product had a purity of 98%. The yield was 83.5% of the theoretical and the efficiency based on residue formation was 87.8%.

EXAMPLE III

*Preparation of vinyl 3,4-epoxycyclohexanecarboxylate*

Vinyl 3-cyclohexenecarboxylate (391 g., 2.57 mols) was placed in a 4-necked flask fitted with a stirrer, dropping funnel, and thermometer. Then over a period of four hours, 657 grams of a 25.5% solution of peracetic acid in acetone (167 g., 2.2 mols of peracetic acid) were fed to the stirred contents of the flask whose temperature was maintained at 30–35° C. by external cooling. After the addition was complete, the reaction solution was maintained at the same temperature for nine more hours.

The reaction solution was then added dropwise to a still kettle containing ethylbenzene refluxing at 25 mm. pressure, and peracetic acid, acetic acid, acetone, and ethylbenzene were distilled during the addition. After addition was over, excess ethylbenzene was stripped off, and the residue product, inhibited with 1.5 grams of pyrogallol, was flash-distilled at 1 mm. pressure. The distillate was inhibited with pyrogallol and redistilled with fractionation yielding 283 grams (84%) of vinyl 3,4-epoxycyclohexanecarboxylate. A sample, B. P. 72° at 1 mm., $n_D^{30}$ 1.4741 was analyzed as follows: carbon: calculated 64.27%, found 64.26%; hydrogen: calculated 7.19%, found 7.10%.

EXAMPLE IV

*Preparation of 3,4-epoxy-6-methylcyclohexanecarboxylic acid*

A solution of 6-methyl-1,2,5,6-tetrahydrobenzoic acid (0.197 mol) in 30 grams of petroleum ether (B. P. 60–70° C.) was treated with a 22.8% solution of peracetic acid (0.3 mol) in acetone for a period of 9 hours at 25–28° C. The reaction mixture was subjected to a low temperature (20–30° C.) distillation on a one-plate column to remove the volatiles. The residue product consisted of a solution of the 3,4-epoxy-6-methylcyclohexanecarboxylic acid in acetic acid. An analysis for epoxide by the hydrogen bromide method indicated a yield of 84.5% of epoxy acid based on the starting unsaturated acid.

In a like manner, other 3,4-epoxycyclohexanecarboxylic acids may be readily prepared by the above method merely by selecting suitable starting materials as outlined previously.

What is claimed is:

1. 7-oxabicyclo [4.1.0] heptane-3-carboxylic acids and derivatives characterized by the following general formula:

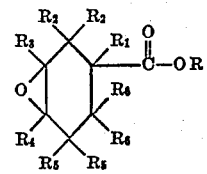

wherein $R_1$, $R_2$, $R_3$, $R_4$, $R_5$ and $R_6$ represent members selected from the group consisting of hydrogen, and lower alkyl groups and R represents members selected from the group consisting of hydrogen and lower aliphatic hydrocarbon groups free from acetylenic unsaturation.

2. Alkenyl esters of lower alkyl-substituted 7-oxabicyclo [4.1.0] heptane-3-carboxylic acids containing from two to three carbon atoms in the alkenyl group.

3. Ethyl 3,4-epoxycyclohexanecarboxylate.

4. Allyl 3,4-epoxycyclohexanecaboxylate.

5. Vinyl 3,4-epoxycyclohexanecarboxylate.

6. 3,4-epoxy-6-methylcyclohexanecarboxylic acid.

7. The lower aliphatic hydrocarbon esters of lower alkyl-substituted 7-oxabicyclo-[4.1.0]-heptane - 3 - carboxylic acid, said esters being free from acetylenic unsaturation.

8. The lower aliphatic hydrocarbon esters of 3,4-epoxycyclohexanecarboxylic acid said esters being free from acetylenic unsaturation.

9. The lower aliphatic hydrocarbon esters of 3,4-epoxy-6-methylcyclohexanecarboxylic acid said esters being free from acetylenic unsaturation.

10. Alkenyl esters of 3,4-epoxycyclohexanecarboxylic acid containing from two through three carbon atoms in the alkenyl group.

11. Alkenyl esters of 3,4-epoxy-6-methylcyclohexanecarboxylic acid containing from two through three carbon atoms in the alkenyl group.

12. The lower aliphatic hydrocarbon esters of monomethyl substituted 3,4-epoxycyclohexanecarboxylic acid said esters being free from acetylenic unsaturation.

13. Alkenyl esters of mono-methyl substituted 3,4-epoxycyclohexanecarboxylic acid containing from two through three carbon atoms in the alkenyl group.

14. Methyl 3,4-epoxycyclohexanecarboxylic acid.

References Cited in the file of this patent

Stoll: Helvetica Chimica Acta, vol. 33, pp. 1510–1515.